United States Patent

[11] 3,610,583

[72] Inventor Cyrus W. Ostrom
 Seattle, Wash.
[21] Appl. No. 30,154
[22] Filed Apr. 20, 1970
[23] Division of Ser. No. 710,681, Feb. 23, 1968, Pat. No. 3,512,757
[45] Patented Oct. 5, 1971
[73] Assignee Consolidated Electric Corporation
 Seattle, Wash.

[54] PERMANENT HORSESHOE MAGNET TRACTION LINE HAUL
 5 Claims, 3 Drawing Figs.
[52] U.S. Cl. .................................................. 254/150,
 198/41, 74/229, 335/302, 335/306
[51] Int. Cl. ...................................................... B66d 1/30
[50] Field of Search ........................................... 254/150;
 198/41; 335/302, 306; 74/229; 226/93

[56] References Cited
UNITED STATES PATENTS
| 493,858 | 3/1893 | Edison | 198/41 |
| 3,338,374 | 8/1967 | Dudley | 335/306 X |
| 3,499,199 | 3/1970 | Mojden et al. | 335/302 X |

Primary Examiner—Harvey C. Hornsby
Assistant Examiner—Merle F. Maffei
Attorney—Robert W. Beach ABSTRACT: A sheave for steel cable in a line haul has a circumferential groove in which the cable fits closely, and unlike poles of permanent horseshoe magnets are spaced circumferentially of the sheave to produce a flux path passing through the cable in the groove. The unlike poles of each magnet are formed by the tips of the horseshoe magnet legs. The magnets can be arranged with unlike poles disposed alternately circumferentially of the sheave in the bottom of the sheave cable-receiving groove. The magnet legs project radially from sides of the sheaves.

PATENTED OCT 5 1971

3,610,583

INVENTOR.
CYRUS W. OSTROM
BY
Robert W. Beach
ATTORNEY 3,610,583

PERMANENT HORSESHOE MAGNET TRACTION LINE HAUL

This application is a division of application Ser. No. 710,681 filed Feb. 23, 1968, now U.S. Pat. No. 3,512,757 for Magnetic Traction Line Haul, which was a continuation of application Ser. No. 564,289 filed July 11, 1966, now abandoned.

In oceanography exploration, submarine cable laying and other deep sea projects, the problem of handling long lines on shipboard occurs. It may be desirable to moor a ship in water having a depth of several thousands of feet. In order to provide a line long enough to reach the bottom at such depths the line itself must be quite heavy simply to support the weight of the line at the surface, in addition to being able to withstand the tension loads placed on lines in maintaining the ship's position against the force of wind and tide. When the size of steel cable is increased to carry its own weight as well as carrying the tension forces placed on it by its use, it becomes necessary to apply a very large hauling force to the line to reel it in when it extends to the ocean bottom at such a depth.

If a cable is simply wound on a winch drum under such circumstances, the tension exerted on the cable to reel it in will produce large forces radially of the drum tending to draw the last cable wrap radially inward between cable wraps previously laid on the drum. Such cable wraps will thus be wedged together, which creates undesirable friction forces between the adjacent wraps of the cable and also produces a wedging thrust directed longitudinally of the drum which can be sufficiently great to force the end flanges of the drum off the cylindrical portion of the drum, so that the cable wraps on the drum can slip over the unflanged drum end.

It is the principal object of the present invention to increase the traction between a cable bight and the groove of a sheave in which such cable bight is received without reliance primarily on the force of friction between the cable and the surface of the sheave groove. It is a specific object to increase such traction by the use of magnetic attraction force providing a flux path through the cable.

A further object is to facilitate the winding of cable on a hauling drum and paying out of the cable from it. An incidental object is to enable cable to be wound on a drum in a more even and orderly fashion, particularly because a wrap of one layer of cable will not be nearly as inclined to be pulled down toward the center of the drum into an inner layer of cable.

Another object is to provide a line haul which will engage the cable generally contiguously instead of pinching it in width so as to produce interstrand friction, and in which the cable will not be forced to slide relative to a strand or strands alongside it which would create friction tending to wear or fray the cable. In particular, it is an object to cradle the cable when under principal stress in a formfitting sheave groove so as to reduce the wear on the cable and also reduce the wear on the sheave groove.

Traction of the cable on a power sheave in greatly increased by utilizing a magnetized sheave in which the lines of magnetic flux between unlike magnet poles pass through the cable in the line-receiving groove of such power sheave. Such magnetic force can be produced by permanent magnets having poles arranged circumferentially of the groove.

A representative line haul employing the present invention is an anchor-line haul for use on shipboard, but it will be understood that the invention has application for any type of line haul. In particular the haul of the present invention is most useful for installations in which great pulling stress must be exerted on a line and/or where it is desirable to store a large amount of cable on a drum which must therefore be of considerable length so that the cable can be laid back and forth on the drum. In such situations the principal hauling force can be applied to the cable independently of the drum, and the winding force exerted by the drum is secondary.

The power drive mechanism is connected to rotate the shaft 2 in the winding direction indicated by the arrow. On this shift is mounted the power sheave 3 into the circumferential groove of which is laid the cable stretch 4 and from the opposite side of which is stripped the cable stretch 5 so as to form a return bend bight of the cable C in the groove of the sheave. Thus the line is engaged with the groove of the sheave over approximately a half wrap.

The heart of the present invention is to provide adequate traction between the cable C and the groove of the sheave to prevent appreciable slippage circumferentially of the sheave while the cable is cradled substantially contiguously in the groove of the sheave without being pinched appreciably. Such traction is accomplished by utilizing a magnetized structure for the sheave arranged so that the steel cable will serve as an armature through which magnetic flux passes between unlike poles of the magnet components. Such magnet components are of the permanent magnet type.

Figure 1:
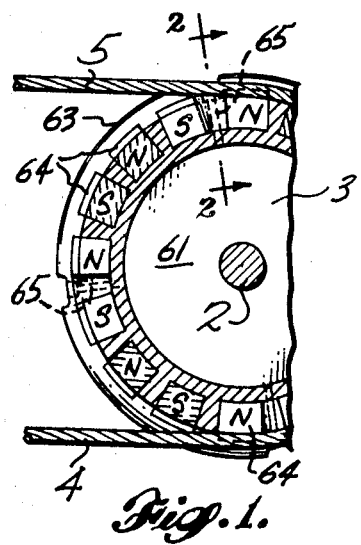
FIG. 1 is a transverse section through a power sheave taken on the plane indicated by line 1—1 of FIG. 2, parts being broken away.
Figure 2:
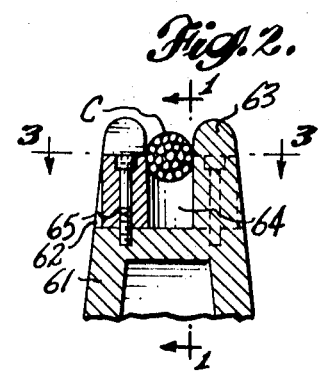
FIG. 2 is a detail radial section through the peripheral portion of such sheave on line 2—2 of FIG. 1.
Figure 3:
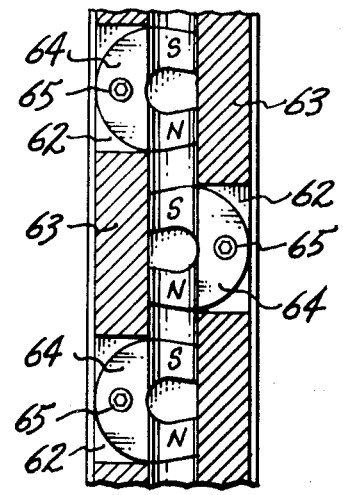
FIG. 3 is a fragmentary circumferential section through the sheave taken at the radius indicated by line 3—3 in FIG. 2.

In the sheave construction shown in FIGS. 1, 2 and 3 the marginal portions of the sheave project radially beyond the circumference of the central portion of the sheave, as shown in FIG. 2. Such marginal portions of the sheave sides and the periphery of the central sheave portion are shaped to form cooperatively the opposite sides and bottom of the line-receiving groove. The depth of such groove is at least half as great as its maximum width, as shown in FIG. 2, so that a line can be wedged firmly between the sides of such groove. The groove provides an anticlastic line-engaging surface.

The central portion of the sheave may be hollow between opposite walls 61. Magnet-receiving sockets 62 are provided in the marginal portion of the sheave immediately beneath the opposite annular flange portions 63 forming the sides of the peripheral groove in which the cable C seats. The magnet sockets 62 open at opposite sides of the sheave for receiving in them horseshoe magnets 64, each of which can be secured in place by a suitable bolt 65 extending through the back of the magnet.

The horseshoe magnets 64 are fitted into the sockets 62 at alternate locations around the periphery of the sheave, as indicated in FIG. 3. Thus one horseshoe magnet is inserted from the left side and the next magnet is inserted from the right side, and and so on around the circumference of the sheave. All of the magnets have one type of pole on the upper side, as seen in FIG. 3, and the other type of pole on the lower side, so that unlike poles are always nearest to each other. The magnetic flux passes between such unlike poles through the steel cable as an armature, both between the unlike poles of a single magnet and between the adjacent unlike poles of two magnets.

By the arrangement described rotation of the sheave causes a cable to be laid in its groove and to be attractively held by constituting the armature through which magnetic flux can pass between unlike magnet poles. Many special alloys, such as one of aluminum, nickel and cobalt, can be utilized to increase the effectiveness of the magnets. Each magnetized power sheave will grip the cable effectively whether it is being reeled in or being paid out. The magnetic action will attract the incoming tighter stretch of the cable as soon as it is laid into the groove of the sheave. At the opposite side of the sheave, the magnetic attraction will attempt to retain in the groove the less taut outrunning stretch of the cable, and such stretch will be stripped from the cable groove by being wound onto another sheave or the drum, or by being drawn away from the sheave groove by the weight of the cable or some other force applied to it.

I claim:

1. A magnet traction line haul comprising a rotative body having a peripheral line-receiving groove, and magnet means carried by said rotative body for attracting and holding a magnet line in such groove including horseshoe magnets arranged circumferentially around the periphery of said rotative body, each magnet having both of its legs projecting from the same side of said groove across said groove to the opposite side of said groove, and the tips of said legs forming magnetic poles in circumferentially spaced portions of said groove, producing magnetic flux paths between unlike magnet poles through the magnetic metal line to draw the line into said groove and increase the traction between the line and said rotative body.

2. The line haul defined in claim 1, in which the horseshoe magnets are arranged alternately so that the legs of adjacent magnets project from opposite side of the rotative body groove.

3. The line haul defined in claim 1, in which the magnets are arranged so that the tips of adjacent legs of adjacent magnets form unlike poles.

4. The line haul defined in claim 2, in which the tips of adjacent legs of adjacent magnets form unlike poles.

5. A line haul having magnetically increased wedging traction comprising a rotative body having a peripheral line-receiving groove of a depth at least approximately half as great as its maximum width, a long flexible stranded cable ship's deep water line of magnetic metal having a stretch received in and bent around a circumferential arc of said rotative body groove and said line stretch having opposite side portions which are spaced arcuately of the line circumference at least 90° bearing wedgingly on opposite side portions of said groove at locations spaced from the groove bottom, and horseshoe magnet means having legs extending transversely of said groove the tips of which form poles arranged along such opposite sides of said groove providing magnetized opposite groove side portions extending in the groove cross section outwardly at least to the portions of the groove sides against which said opposite side portions of said line stretch bear wedgingly, which poles produce a magnetic flux path through said line extending at an angle to the length of said groove and of said line stretch therein to press said opposite side portions of said line stretch against said opposite side portions of said groove and increase the traction between said opposite side portions of said line stretch and said opposite side potions of said rotative body groove against which said opposite side portions of said line stretch bear wedgingly.